Patented July 8, 1941

2,248,636

UNITED STATES PATENT OFFICE 2,248,636

BENTONITE PRODUCT

James Marsden, Schenectady, N. Y., assignor to General Electric Company, a corporation of New York No Drawing. Application March 25, 1939, Serial No. 264,236

5 Claims. (Cl. 106—287)

The present invention comprises an improvement in sheet material made from bentonite particles of colloidal fineness, and its object is to provide bentonite sheet material of improved physical properties.

When bentonite, as occurring in natural deposits, is suspended in water and subjected to gravitational settling and other purification for the removal of coarse particles and other impurities, a gel-like product may be obtained by centrifugal selection of the finer particles, (preferably less than 3000 angstroms in diameter). Such a bentonite gel when dried in thin layers results in a sheet of paper-like characteristics. However, this sheet material has a relatively low tensile strength and flexibility. The paper-like product, when placed in water, tends to disintegrate or re-gel.

As described in a copending application, Serial No. 307,807, filed December 19, 1940, as a continuation-in-part of an earlier application Serial No. 263,193, filed on March 23, 1939, by Theodore R. Walters, the tensile strength and flexibility of such paper-like bentonite sheet product can be improved by the incorporation therein of inorganic fibers to which the bentonite tenaciously adheres.

In accordance with my present invention, a further improvement in flexibility, strength and other physical properties of such bentonite products may be effected by the presence of an organic amine in the product.

In carrying out my invention the raw bentonite, obtained as a natural product, first is purified to remove coarse particles and soluble impurities. Conveniently, the bentonite may be suspended in distilled water and the particles settling after about 24 hours are rejected. The soluble particles may be removed by electrodialysis. Preferably, the coarser particles still staying in suspension after this period of settling are removed by a high speed centrifuge.

Specifically, the aqueous suspension may be passed through a Sharples super-centrifuge operating at 50,000 R. P. M., which grades solid particles removed from the liquid in such a way that bentonite particles having a diameter less than about 3000 angstroms may be selected. These smaller particles are re-suspended in water, or conveniently in the liquid rejected by the centrifuge which contains still finer particles in suspension. To this aqueous suspension alcohol, or other suitable material capable of rendering an organic amine soluble, is added. Conveniently about 50 per cent of ordinary denatured ethyl alcohol is added to the aqueous suspension. An amine, such for example as diamyl amine, triethylene tetramine, or ethylene diamine, is dissolved therein. The amount of amine so added will depend upon the properties and the service desired for the finished product. If it is only desired to increase the flexibility of the finished product, the amount of amine may, not be materially greater than about 1 per cent of total solids. If it is desired to render the final product non-gelling, or resistant to water, then a materially greater amount of amine, say 10 to 20 per cent by weight, should be added. For flexibilizing purposes, I prefer to add about 1 per cent of amine, and prefer to employ triethylene tetramine. An aqueous bentonite suspension containing an amine, the solid content of which is about 2 to 3 per cent, is again subjected to centrifugal separation. A gel of soft, unctuous consistency is deposited on the liner of the centrifuge, this gel consisting roughly of about 90 per cent water and about 10 per cent of bentonite particles associated with amine. This material may be allowed to dry, forming a sheet of the thickness of about .004 inch. When dried, it forms a coherent flexible sheet. It is possible, of course, to avoid the subsequent centrifugal separation and to produce the final sheet product by evaporating aqueous alcohol suspension of bentonite which contains an amine in a suitable container.

In some cases the material may be applied on a mat of fine glass fibers. Preferably the glass fibers are bonded in a preliminary way either in random arrangement or arranged preponderantly in one direction. The thickness of the layer of bentonite gel may vary according to the conditions, but for the preparation of a thin paper should be about 5 mils in thickness. When the gel is applied upon fibers, it may advantageously be worked into intimate contact with the fibers. For example, the gel when spread upon a fiber may be subjected to a gentle rubbing treatment between smooth surfaces.

Upon the drying of the bentonite gel containing amine either with or without glass fiber, a thin membrane of paper-like consistency results. The addition of amine to the bentonite suspensions so materially increases the flexibility of the bentonite sheets that they may be folded to form a crease without cracking. Bentonite sheets of a thickness of 2 to 3 mils, prepared in the above manner from a material containing an amine, have a tensile strength of approximately 3500 pounds per square inch, even when glass fibers are not present. The sheets thus prepared by the addition of an amine do not disintegrate in water. Dielectric strength of such sheets ranges from about 3 to 4 kilovolts per mil. The bentonite product containing glass fibers, when prepared using a bentonite gel and an amine, possess sufficient flexibility to allow folding of the product without breaking the glass fibers.

What I claim as new and desire to secure by Letters Patent of the United States is:

1. A sheet material constituting the dried residue of bentonite gel containing about one per cent of triethylene tetramine.

2. A sheet material consisting preponderantly of bentonite and containing by weight at least about one per cent of an amine.

3. A paper-like sheet material consisting essentially of bentonite and containing an amine.

4. A flexible paper-like sheet material having a thickness of about 2 to 3 mils, a tensile strength of approximately 3500 pounds per square inch, consisting essentially of bentonite particles having a maximum diameter of about 3000 angstroms and containing about 1 to 20 per cent by weight of an organic amine.

5. A paper-like sheet material which is several mils in thickness consisting of a dried residue derived from a layer of aqueous bentonite gel containing triethylene tetramine as the only modifying ingredient, the latter ingredient amounting to at least about one per cent of said material.

JAMES MARSDEN.